United States Patent
Fukazu et al.

(10) Patent No.: US 8,479,867 B2
(45) Date of Patent: Jul. 9, 2013

(54) VEHICLE DRIVE UNIT

(75) Inventors: Tomohiro Fukazu, Utsunomiya (JP); Hiroshi Otsuka, Utsunomiya (JP); Masahiro Shimada, Utsunomiya (JP); Jun Masuda, Takanezawa (JP); Masaki Ogami, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 15 days.

(21) Appl. No.: 13/288,218

(22) Filed: Nov. 3, 2011

(65) Prior Publication Data
US 2012/0112537 A1  May 10, 2012

(30) Foreign Application Priority Data
Nov. 5, 2010 (JP) .................................. 2010-248942

(51) Int. Cl.
*B60K 1/00* (2006.01)
(52) U.S. Cl.
USPC ........................................................ 180/291
(58) Field of Classification Search
USPC ................. 180/65.31, 65.6, 65.1, 282, 292, 180/300
See application file for complete search history.

(56) References Cited

U.S. PATENT DOCUMENTS

| 6,460,642 B1 | 10/2002 | Hirano |
| 8,172,019 B2 * | 5/2012 | Takeda ........................ 180/65.31 |
| 2011/0108336 A1 | 5/2011 | Takeda |

FOREIGN PATENT DOCUMENTS

| JP | 2000152470 | 5/2000 |
| JP | 2005104329 | 4/2005 |
| JP | 2009051396 | 3/2009 |
| JP | 2011098673 | 5/2011 |

* cited by examiner

*Primary Examiner* — John Walters
*Assistant Examiner* — James Triggs
(74) *Attorney, Agent, or Firm* — Clifford B Vaterlaus

(57) ABSTRACT

A vehicle drive unit includes a motor as a power source, a power control unit supported by a vehicle body, and a three-phase cable that connects the power control unit and the motor. A first end portion of the three-phase cable is connected to the power control unit toward the rear of the vehicle in a direction orthogonal to a rotary axis of the motor, a second end portion of the three-phase cable is connected to the motor toward the front of the vehicle in the orthogonal direction, and a U-shaped swing absorber that is curved to extend in the orthogonal direction is provided between the first end portion and the second end portion of the three-phase cable.

20 Claims, 5 Drawing Sheets

VEHICLE DRIVE UNIT

CROSS REFERENCE TO RELATED APPLICATIONS

The present application claims priority under 35 U.S.C. §119 to Japanese Patent Application No. 2010-248942, filed Nov. 5, 2010, entitled "Vehicle Drive Unit," the contents of which are incorporated herein by reference in their entirety.

TECHNICAL FIELD

The present disclosure relates to a vehicle drive unit of an electric vehicle or a hybrid vehicle equipped with an electric motor as a power source.

RELATED ART

Conventionally, in a wiring structure between an electric power system unit (power control unit), such as an inverter and the like, and an electric motor, techniques have been proposed to prevent damage to or loosening of cables due to impacts and the like. For example, a bypass section has been provided that allows cables to be arranged in a circumventing path along the drive axis direction using a surplus length portion that lengthens a cable to allow the absorption of relative motion.

However, in that arrangement, because three phase lines are bundled into one cable and the diameter of the cables increases when increased voltage is supplied to a motor, it is difficult to provide a bypass section that allows the cables extended in the downward direction to bend in the drive axis direction. Moreover, because it is necessary to arrange the electric motor and the electric power system device as close to each other as possible due to height limitations under the hood related to pedestrian safety considerations, there is not enough vertical space available and there is a problem in that it is difficult to arrange the cable.

SUMMARY

One aspect of the present disclosure provides a vehicle drive unit that allows for the easy arrangement of cables and in which damage to or loosening of the cables can be prevented.

One embodiment of the present disclosure includes an electric motor (for example, a motor 4 according to the following embodiments) as a power source; a power control unit (for example, a power control unit 5 according to the following embodiments) supported by a vehicle body; and a three-phase cable (for example, a three-phase cable 41 according to the following embodiments) connecting the power control unit and the electric motor; wherein, a first end portion of the three-phase cable (for example, a first end portion 41a according to the following embodiments) is connected to a first end side of the power control unit in a direction orthogonal to a rotary shaft of the electric motor, a second end portion of the three-phase cable (for example, a second end portion 41b according to the following embodiments) is connected to a second end side of the electric motor in the orthogonal direction, and a U-shaped swing absorber (for example, a swing absorber 44 according to the following embodiments) that is curved to extend in the orthogonal direction is provided between the first end portion and the second end portion of the three-phase cable.

Another embodiment of the present disclosure may be provided in which the three-phase cable includes a first fixing portion (for example, a motor first fixing portion 45 according to the following embodiments) for fixing the three-phase cable to a frame (for example, a PCU frame 21 according to the following embodiments) that connects the power control unit and the vehicle body, and a second fixing portion (for example, a motor second fixing portion 46 according to the following embodiments) for fixing the three-phase cable to a case that houses the electric motor (for example, a case 7 according to the following embodiments); and wherein the swing absorber is arranged between the first fixing portion and the second fixing portion.

A further embodiment may be configured such that the first fixing section is provided near a connector (for example, a PCU side motor connector 43 according to the following embodiments) that is connected to the power control unit.

Another embodiment may include an engine (for example, an engine 2 according to the following embodiments) as a power source, wherein the three-phase cable passes between the engine and the electric motor in a rotary axis direction of the electric motor.

In another embodiment, the three-phase cable is arranged on an inner side in the orthogonal direction from the case that houses the electric motor.

Another embodiment may include a second electric motor (for example, a generator 3 according to the following embodiments), and a second three-phase cable (for example, a second three-phase cable 51 according to the following embodiments) that connects the power control unit and the second electric motor, wherein a first end portion (for example, a first end portion 51a according to the following embodiments) of the second three-phase cable is connected to the second end side of the power control unit in the orthogonal direction, and a second end portion (for example, a second end portion 51b according to the following embodiments) of the second three-phase cable is connected to the first end side of the second electric motor in the orthogonal direction, and a second U-shaped swing absorber (for example, a second swing absorber 54 according to the following embodiments), that is curved to extend to an opposite side as the swing absorber in the orthogonal direction, is provided between the first end portion and the second end portion of the second three-phase cable.

In one embodiment, at least one of the three-phase cable and the second three-phase cable includes a first fixing section (for example, a motor first fixing section 45 and a generator first fixing section 55 according to the following embodiments) for fixing the three-phase cable to a frame that connects the power control unit and the vehicle body, and a second fixing section (for example, a motor second fixing section 46 and a generator second fixing section 56 according to the following embodiments) for fixing the three-phase cable to a case that houses the electric motor and the second electric motor, wherein at least one of the swing absorber and the second swing absorber is arranged between the first fixing section and the second fixing section.

In one embodiment, the first fixing section is provided near a connector (for example, a PCU side motor connector 43 or a PCU side generator connector 53 according to the following embodiments) that is connected to the power control unit.

Another embodiment further includes an engine as a power source, wherein at least one of the three-phase cable and the second three-phase cable passes between the engine and the electric motor in a rotary axis direction of the electric motor.

In one embodiment, at least one of the three-phase cable and the second three-phase cable is arranged on an inner side in the orthogonal direction from the case that houses the electric motor and the second electric motor.

One embodiment includes a swing absorber formed in a U-shape and projecting in a direction orthogonal to a rotary axis of an electric motor, wherein, based on a three-phase cable that connects an end side orthogonal to a power control unit and a second end side orthogonally behind the electric motor, the cable can bend easily in a substantially single plane and the cable length can be lengthened. As a result, swinging in a direction orthogonal to the rotary axis of the electric motor can be absorbed, damage to and loosening of the three-phase cable can be prevented, and the three-phase cable can be easily arranged.

According to one embodiment, the U-shape that can absorb swinging of the three-phase cable in the front-back direction of the vehicle body can be maintained by providing the swing absorber between the two fixed sections, and because the three-phase cable is fixed to the solid case by the second fixing section, the swing absorber can absorb even more swing.

According to one aspect of the present disclosure, loosening of the connector can be prevented, because swing is not transferred to the connector.

According to another feature of the present disclosure, damage to the three-phase cable can be prevented, because the three-phase cable is arranged between the rigid engine and electric motor.

According to a further feature of the present disclosure, damage to the three-phase cable can be prevented.

According to another aspect of the present disclosure, because the two three-phase cables are arranged opposite to each other in the direction orthogonal to the rotary axis of the electric motor, swinging in the front-back direction of the vehicle body of both of the three-phase cables can be dispersed and absorbed.

DETAILED DESCRIPTION

Herein, a drive unit of a vehicle body according to embodiments of the present disclosure will be described in reference to the accompanying drawings. In the figures, "Fr" refers to the frontward or forward direction, "Re" refers to the rearward direction, "L" refers to the direction toward the left side, "R" refers to the direction toward the right side, "U" refers to the upward direction, and "D" refers to the downward direction.

Figure 1:
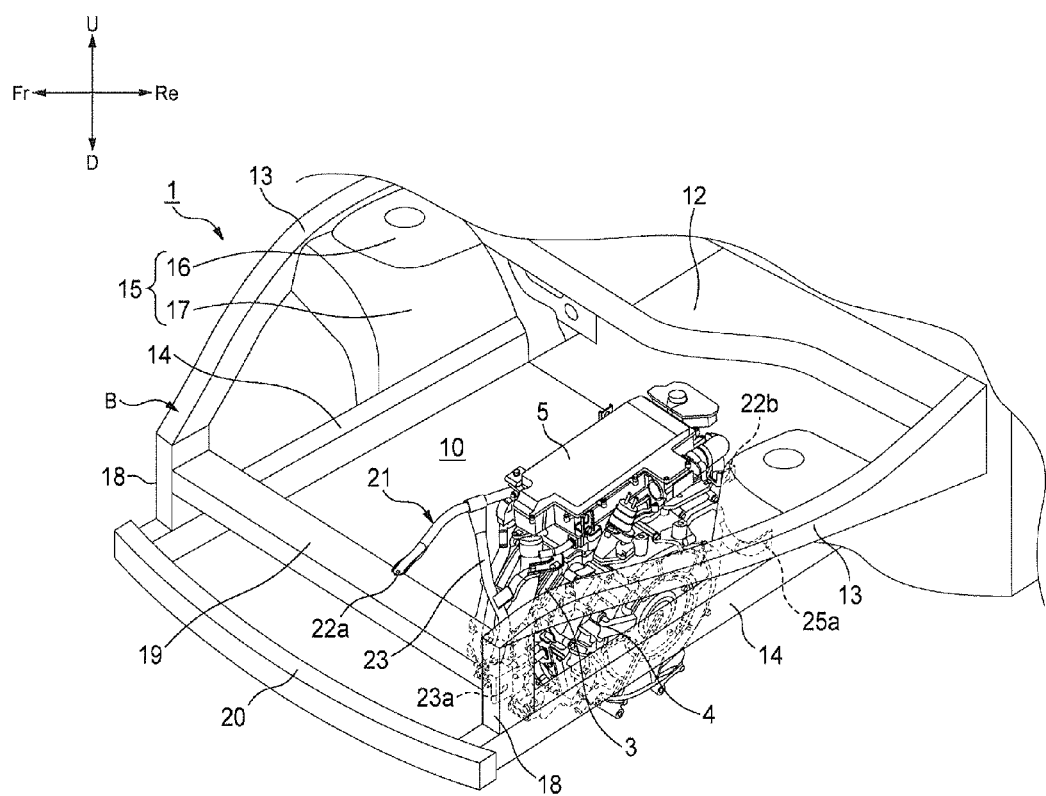
FIG. 1 is a perspective view showing the front of a vehicle body to which a drive unit of the present disclosure is attached.
Figure 2:
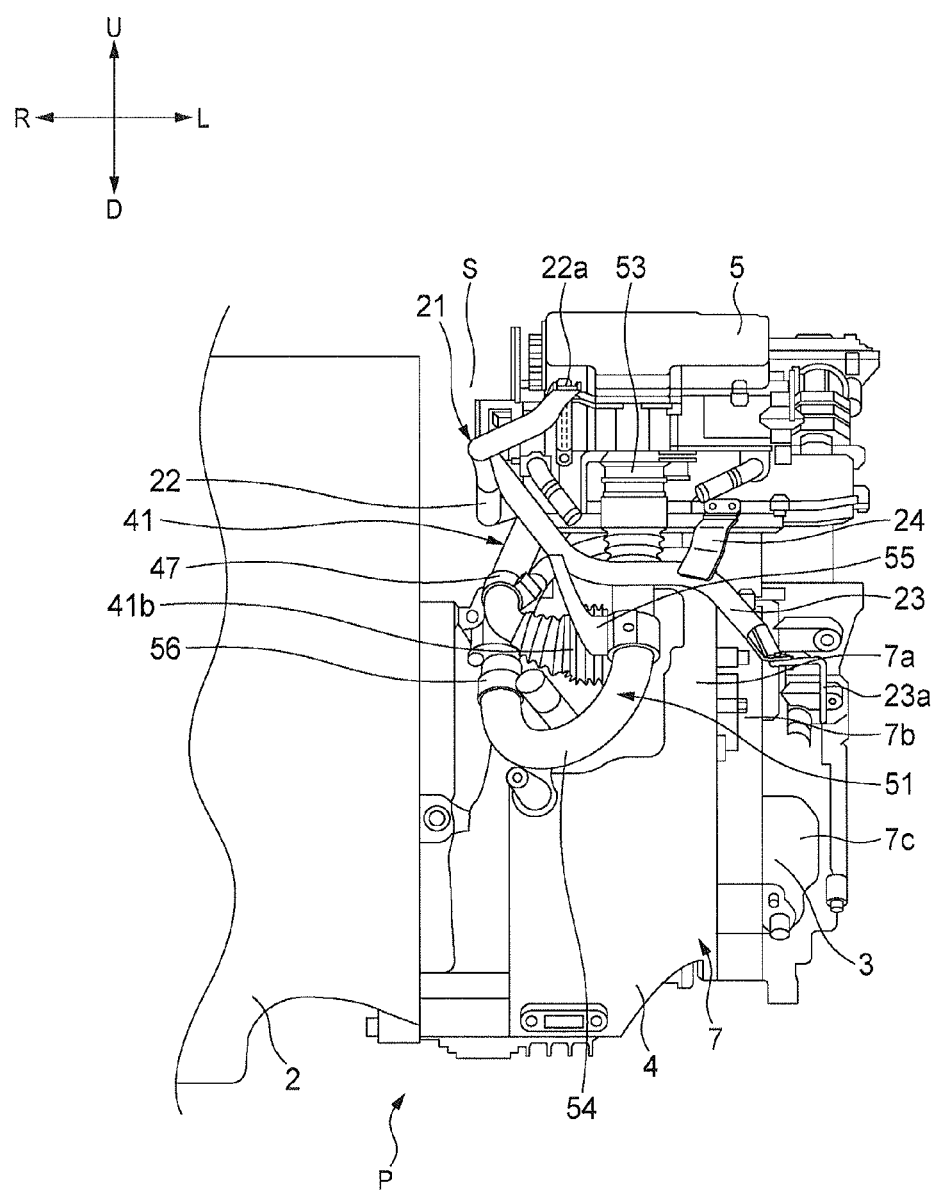
FIG. 2 is a front view of the drive unit.

FIG. 1 shows the front of a vehicle body B of a hybrid vehicle. A vehicle 1 includes an engine 2 (see FIG. 2) as a power source, a generator (a second electric motor) 3 that is driven by a mechanical output of the engine 2, a high voltage battery (not shown) that is charged by an electrical output of the generator 3, a motor (electric motor) 4 as a drive source that uses at least one of an electrical discharge output of the battery and an electrical discharge of the generator 3 to drive a drive wheel (not shown), and a PCU (power control unit) 5 that controls the voltage for operating the generator 3 and the motor 4. The engine 2, the generator 3, the motor 4, and the PCU 5 make up a drive unit of the vehicle.

Although not shown in the figures, the PCU 5 is equipped with a power module that includes a converter circuit and an inverter circuit, a capacitor, a reactor, a gate drive plate (GDCB), a control unit (ECU), and the like. The PCU 5 converts direct current voltage supplied by the battery to alternating current voltage after boosting the voltage, and supplies the voltage to the motor 4 to drive the motor 4, and also converts recycled voltage that is recycled by a recycling operation of the motor 4 to direct current voltage, and then reduces the voltage and supplies the voltage to the battery. Additionally, the PCU 5 converts voltage regenerated by the generator 3 to direct current voltage, and then reduces the voltage and supplies the voltage to the battery, or conversely, drives the motor 4 using the voltage generated by the generator 3.

Additionally, a water jacket (not shown) for cooling the above components is provided in an inner portion of the PCU 5, and a tank 6 for controlling liquid pressure and for trapping air inside the water jacket cooling water channels, is provided behind the PCU 5.

A power unit P (see FIG. 2, only the generator 3 and the motor 4 are shown in FIG. 1) composed of the engine 2, the generator 3, and the motor 4 arranged linearly in order is installed in an engine room 10 at the front of the vehicle body B. As illustrated in FIG. 1, the front of the vehicle body B includes a dashboard 12 that separates the engine room 10 from the vehicle interior, a pair of front upper members 13 extending toward the front from the right and left of the dashboard 12, and a pair of front side frames 14 on the left and right.

Damper housings 15 form a bridge between the front upper members 13 and the front side frames 14. The damper housings 15 connect the front upper members 13 to a portion of the peripheries of damper bases 16, and connect the front side frames 14 to a portion of the bottoms of side walls 17.

Side bulkheads 18 that extend vertically are provided at front ends of the left and right front side frames 14, and are connected to each other by a bulkhead lower frame 20. Top portions of the side bulkheads 18 are connected to each other by a bulkhead upper frame 19 that extends in the vehicle width direction.

Inside the engine room 10, the power unit P is supported by the vehicle body B via a mount (not shown), and the PCU 5 that supplies electrical power to the motor 4 and the generator 3 is supported by the vehicle body B via a PCU frame 21.

Figure 3:
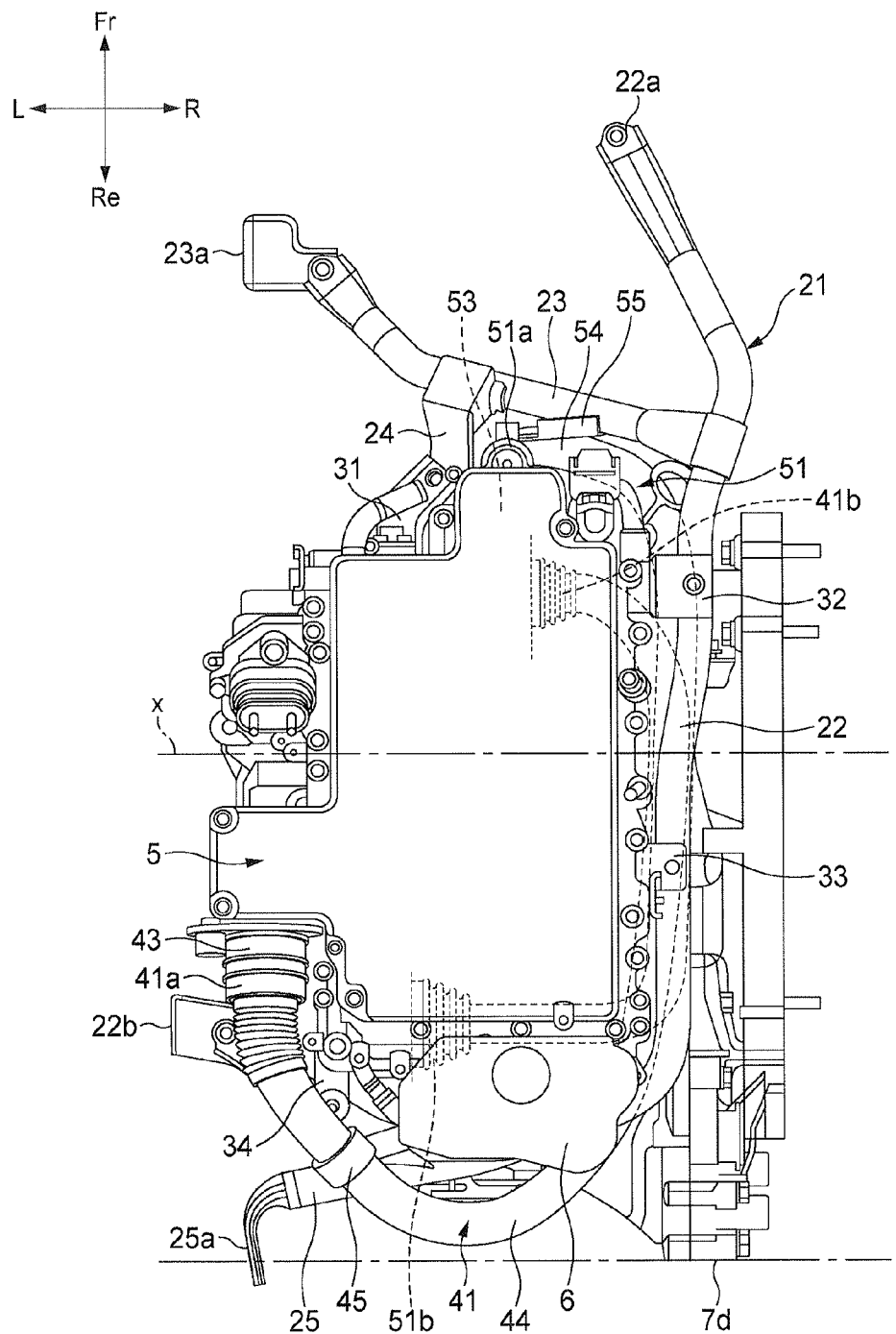
FIG. 3 is a top view of the drive unit.
Figure 4:
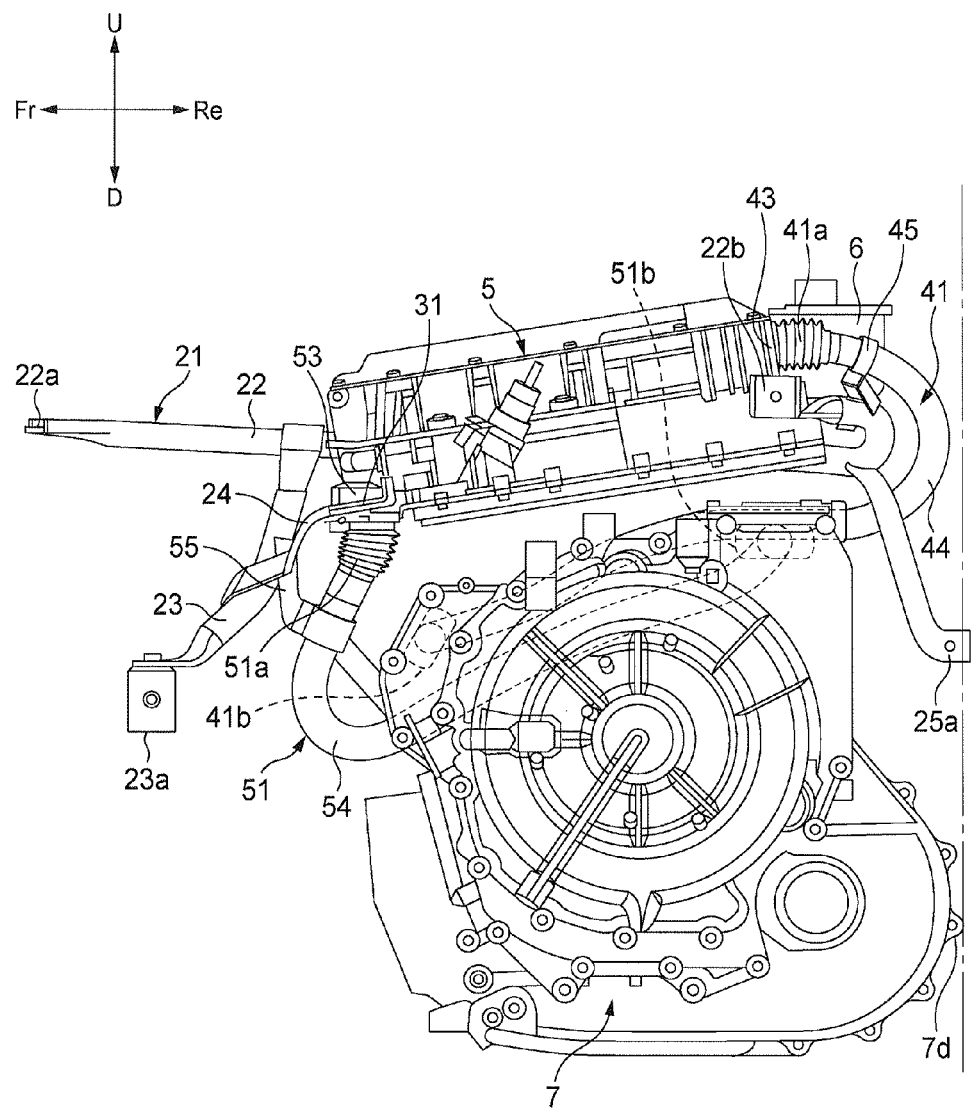
FIG. 4 is side view of the drive unit.

As shown in FIG. 3, the PCU frame 21 is configured by the welding of multiple frame components 22, 23, 24, and 25. Specifically, the frame component 22 passes in front of and to the right of the PCU 5 and then bends to extend behind the PCU 5 while passing through a recessed space S (see FIG. 2) formed between the PCU 5, the engine 2, and the case 7 that houses the generator 3 and the motor 4. The frame component 23 is welded to the front part of the frame component 22 and extends diagonally forward in front of the PCU 5. The frame component 24 is welded to the middle section of the frame component 23 and is connected to a bracket 31 provided at the front side surface of the PCU 5. The frame component 25 is welded at a rear portion of the frame component 22 and extends diagonally downward. As a result, the PCU frame 21 is bolted to substantially rectangular brackets 31, 32, 33, and 34 provided respectively at one location on the front side surface, two locations at the front and back of the right side surface, and one location at the rear side surface of the PCU 5. Additionally, the PCU frame 21 is attached to the bulkhead upper frame 19, the damper base 16, the side bulkhead 18, and the front upper member 13 of the vehicle body B in four end portion locations, namely two end portions 22a and 22b of the frame component 22, end portion 23a of the frame component 23, and end portion 25a of the frame component 25 (see FIG. 1). A portion of the frame component 22 located at the vehicle front side of the PCU 5 and the frame component 23 is formed to allow easy deformation during a collision. As a result of the bending of the portion of the frame component 22 and the frame component 23 during a collision, the power unit P and the PCU 5 move together, and functions of swing absorbers 44 and 54 (mentioned below) work together to prevent loosening of three-phase cables 41 and 51. The PCU frame 21 can be freely formed if there is a structure that allows the PCU 5 to be supported by the vehicle body B.

The PCU 5 supported by the PCU frame 21 in this way is arranged diagonally upward facing from the front of the vehicle toward the rear to prevent spillage of cooling water when opening the tank 6 and to improve the ability to pour water into the tank 6. The case 7 is configured as three divided cases 7a, 7b, and 7c that are connected by bolts such that the motor 4 is housed between the divided cases 7a and 7b, and the generator 3 is housed between the divided cases 7b and 7c.

A three-phase cable 41 is connected between the PCU 5 and the motor 4, and a second three-phase cable 51 is connected between the PCU 5 and the generator 3.

The first end portion 41a of the three-phase cable 41 is connected from the rear to a PCU-side motor connector 43 provided on the left side and on the first end side (facing the rear of the vehicle body) of the PCU 5 in relation to a rotary axis x, in a direction (front-back direction of the vehicle body) orthogonal to the rotary axis x of the motor 4. It will be understood that the rotary axis x depicted in FIG. 3 also schematically represents a rotary shaft of the motor 4. Additionally, a second end portion 41b of the three-phase cable 41 is connected on the right side to a motor-side connector (not shown) provided at a second end side in relation to the rotary axis x in an orthogonal direction of the case 7 that houses the motor 4. As a result, the three-phase cable 41 passes below the PCU frame 21 inside the recessed space S. In other words, as shown in FIG. 3, the first end side of the drive unit (or the PCU 5 and the motor 4 that comprise part of the drive unit) is located rearward of the rotary axis x in the direction orthogonal to the rotary axis x. The second end side of the drive unit is located forward of the rotary axis x in the direction orthogonal to the rotary axis x. Accordingly, in one embodiment, the first end portion 41a of the three-phase cable 41 may be connected to the PCU 5 on the first end side of the drive unit or PCU 5, and the second end portion 41b of the three-phase cable 41 may be connected to the motor 4 on the second end side of the drive unit or motor 4. The cable 41 may extend from the PCU 5 in a first direction, and curve to extend in a second, substantially opposite direction to form a swing absorber 44 between the first end portion 41a and the second end portion 41b. The cable 41 may extend laterally, for example in a front to rear direction, along a majority length of the PCU 5.

Figure 5:
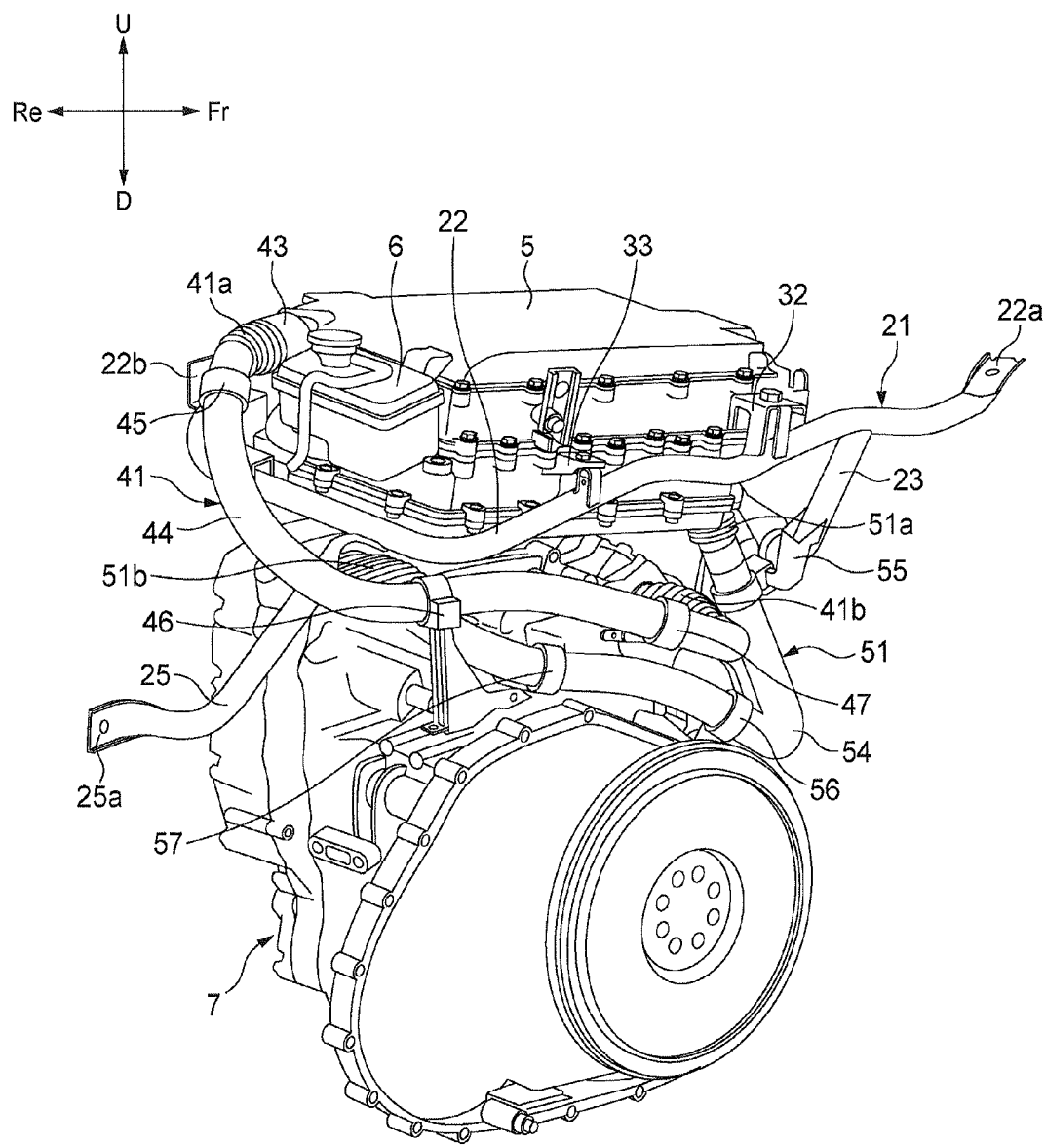
FIG. 5 is a perspective view of the drive unit showing a supported state of three-phase cables extending from the power control unit.

Additionally, as illustrated in FIG. 5, the three-phase cable 41 has a first motor fixing portion 45 for fixing the three-phase cable to the PCU frame 21 near the PCU-side motor connector 43, a second motor fixing portion 46 for fixing three-phase cable to the case 7 that houses the motor 4, and a third motor fixing portion 47 for fixing three-phase cable to the case 7 at an opposite side to the first motor fixing portion 45 in relation to the second motor fixing portion 46. The section between the first end portion 41a and the second end portion 41b of the three-phase cable 41 arranged between the first motor fixing portion 45 and the second motor fixing portion 46 forms a U-shaped swing absorber 44 that is curved to extend in a direction orthogonal to the rear of the PCU 5. The three-phase cable formed in this way can easily bend in a substantially single diagonal plane, and, by forming the swing absorber 44 that is curved to hold surplus cable length, swinging in the orthogonal direction due to the engine 2 is absorbed, which prevents damage to and loosening of the three-phase cable 41. However, the swing absorber 44 of the three-phase cable 41 is arranged on the inner side in the orthogonal direction from the case 7 that houses the motor 4, e.g., closer to the rotary axis x than the rear end of the case 7 in the orthogonal direction.

Conversely, a first end portion M a of the second three-phase cable 51 is connected from the bottom direction to a PCU-side generator connector 53 provided on the side surface of the second end side (front direction of vehicle body) of the PCU 5 in relation to the rotary axis x in an orthogonal direction. Additionally, a second end portion 51b of the second three-phase cable 51 is connected from the right side to a generator-side connector (not shown) provided at a first end side (rear direction of the vehicle body) of the case 7 in relation to the rotary axis x in an orthogonal direction. As a result, the second three-phase cable 51 passes below the PCU frame 21 and the three-phase cable 41 inside the recessed space S.

Moreover, the second three-phase cable 51 similarly has a first generator fixing portion 55 for fixing to the PCU frame 21 near the PCU-side generator connector 53, a second generator fixing portion 56 for fixing to the case 7 that houses the motor 4, and a third generator fixing portion 57 for fixing to the case 7 at an opposite side to the first generator fixing portion 55 in relation to the second generator fixing portion 56. The portion between the first end portion 51a and the second end portion 51b of the second three-phase cable 51 arranged between the first generator fixing portion 55 and the second generator fixing portion 56 forms a U-shaped second swing absorber 54 that is curved to extend in a direction orthogonal to the front of the PCU 5 on an opposite side to the swing absorber 44 in the orthogonal direction. The second three-phase cable 51 formed in this way can easily bend in a substantially single diagonal plane, and, by forming the second swing absorber 54 that is curved to hold surplus cable length, swinging in the orthogonal direction due to the engine 2 is absorbed, which prevents damage to and loosening of the three-phase cable 41.

According to the drive unit of the vehicle configured in this way, the three-phase cable 41 connecting the PCU 5 and the motor 4 includes the U-shaped swing absorber 44 that is curved to extend in a direction orthogonal to the rotary axis x of the motor 4, and is connected to the first end side orthogonal to the PCU 5 at the second end side orthogonal to the motor 4. As a result, the three-phase cable 41 can bend easily in a substantially single plane and can take up a longer cable length. As a result, swinging in a direction orthogonal to the rotary axis x of the motor 4 due to the engine 2 can be absorbed, damage to and loosening of the three-phase cable 41 can be prevented, and the three-phase cable 41 can be easily removed.

Furthermore, the second three-phase cable 51 connecting the PCU 5 and the generator 3 includes the U-shaped second swing absorber 54 that is curved to extend on the opposite side to the swing absorber 44 in the orthogonal direction, so as to be connected to the orthogonal direction second end side of the PCU 5 at the first end side orthogonal to the generator 3. As a result, both of the three-phase cables 41 and 51 are arranged in an orthogonal direction opposite to each other in relation to the rotary axis x of the motor 4, thus allowing swing in the vehicle body front-back direction to be dispersed and absorbed by both of the three-phase cables 41 and 51.

Furthermore, the three-phase cable 41 and the three-phase cable 51 have the first fixing portions 45 and 55 for fixing the cables to the PCU frame 21 connecting the PCU 5 to the vehicle body B, and the second fixing portions 46 and 56 for fixing the cables to the case 7, and the swing absorbers 44 and 54 are arranged between the first fixing portions 45 and 55 and the second fixing portions 46 and 56 respectively. As a result, the three-phase cables 41 and 51 can keep a U-shape that absorbs swing in the vehicle body front-back direction. Moreover, because the three-phase cables 41 and 51 are fixed to the solid case 7 with the second fixing portions 46 and 56, the swing absorbers 44 and 54 can better absorb the swinging.

Additionally, the first fixing portions 45 and 55 do not allow transfer of the swing to the connectors 43 and 53, because the first fixing portions 45 and 55 are provided near the connectors 43 and 53 connected to the PCU 5, thus preventing loosening of the connectors 43 and 53.

Furthermore, because the three-phase cable 41 and the second three-phase cable 51 pass between the engine 2 and the motor 4 in the rotary axis direction x of the motor 4, the three-phase cables 41 and 51 are arranged between the rigid body engine 2 and the motor 4, thus preventing damage to the three-phase cables 41 and 51.

Furthermore, because the three-phase cable 41 and 51 is arranged on the inner side in orthogonal direction from the case 7 that houses the motor 4, damage to the three-phase cables 41 and 51 can be prevented.

The present disclosure is not limited to the abovementioned embodiments and alternatives, and can be modified or improved as appropriate.

For example, in the abovementioned embodiment, although a vehicle drive unit with two electric motors and having two three-phase cables connecting a power control unit and the electric motors has been described, the embodiment may also be applicable to a vehicle drive unit having one electric motor. Furthermore, in the abovementioned embodiment, although the two electric motors are configured with a generator and a motor as the power units, the two electric motors may also be configured with two motors as the power units in the present disclosure.

Moreover, although a three-phase cable has been described, any suitable cable may be used. Furthermore, if one three-phase cable is used, a first end side connected to the power control unit and a second end side connected to the case that houses the electric motor may be arranged on both sides in relation to the rotary axis of the electric motor. Specifically, the first end side of the three-phase cable may be in the front, and the second end side may be in the rear in relation to the rotary axis; or the first end side may be in the rear and the second end side may be in the front.

The following reference numbers are used throughout FIGS. 1-5: 2 Engine; 3 Generator (Second Generator); 4 Motor (Electric Motor); 5 Power Control Unit; 7 Case; 21 PCU Frame (Frame); 41 Three-Phase Cable; 41a First End Portion; 41b Second End Portion; 43 PCU-Side Motor Connector (Connector); 44 Swing Absorber; 45 First Motor Fixing Portion (First Fixing Portion); 46 Second Motor Fixing Portion (Second Fixing Portion); 51 Second Three-Phase Cable; 51a First End Portion; 51b Second End Portion; 53 PCU-Side Generator Connector (Connector); 54 Second Swing Absorber; 55 First Generator Fixing Portion (First Fixing Portion); 56 Second Generator Fixing Portion (Second Fixing Portion); and x Rotary Axis.

What is claimed is:

1. A vehicle drive unit comprising:
    an electric motor as a power source;
    a power control unit supported by a vehicle body; and
    a three-phase cable connecting the power control unit and the electric motor; wherein:
    a first end portion of the three-phase cable is connected to a first end side of the power control unit in a direction orthogonal to a rotary shaft of the electric motor;
    a second end portion of the three-phase cable is connected to a second end side of the electric motor in the orthogonal direction; and
    a U-shaped swing absorber that is curved to extend in the orthogonal direction is provided between the first end portion and the second end portion of the three-phase cable;
    wherein the first end portion and the second end portion of the three-phase cable are on opposite sides of the rotary shaft in the orthogonal direction.

2. The vehicle drive unit according to claim 1 wherein, the three-phase cable has a first fixing portion for fixing the three-phase cable to a frame that connects the power control unit and the vehicle body, and a second fixing portion for fixing the three-phase cable to a case that houses the electric motor; and wherein the swing absorber is arranged between the first fixing portion and the second fixing portion.

3. The vehicle drive unit according to claim 2 wherein, the first fixing portion is provided near a connector connected to the power control unit.

4. A vehicle drive unit comprising:
    an engine as a power source;
    an electric motor as a power source;
    a power control unit supported by a vehicle body; and
    a three-phase cable connecting the power control unit and the electric motor; wherein:
    a first end portion of the three-phase cable is connected to a first end side of the power control unit in a direction orthogonal to a rotary shaft of the electric motor;
    a second end portion of the three-phase cable is connected to a second end side of the electric motor in the orthogonal direction;
    a U-shaped swing absorber that is curved to extend in the orthogonal direction is provided between the first end portion and the second end portion of the three-phase cable; and
    wherein the three-phase cable passes between the engine and the electric motor in a rotary axis direction of the electric motor.

5. The vehicle drive unit according to claim 1, wherein the three-phase cable is arranged on an inner side in the orthogonal direction from a case that houses the electric motor.

6. The vehicle drive unit according to claim 1 further comprising:
    a second electric motor; and
    a second three-phase cable that connects the power control unit and the second electric motor; wherein:
    a first end portion of the second three-phase cable is connected to the second end side of the power control unit in the orthogonal direction;
    a second end portion of the second three-phase cable is connected to the first end side of the second electric motor in the orthogonal direction; and
    a second U-shaped swing absorber that is curved to extend to an opposite side as the swing absorber in the orthogonal direction is provided between the first end portion and the second end portion of the second three-phase cable.

7. The vehicle drive unit according to claim 6, wherein:
    at least one of the three-phase cable and the second three-phase cable has a first fixing portion for fixing the three-phase cable to a frame that connects the power control unit and the vehicle body, a second fixing portion for fixing the three-phase cable to a case that houses the electric motor, and at least one of the swing absorber and the second swing absorber is arranged between the first fixing portion and the second fixing portion.

8. The vehicle drive unit according to claim 7, wherein the first fixing portion is provided near a connector connected to the power control unit.

9. The vehicle drive unit according to claim 6, further comprising an engine as a power source, wherein at least one of the three-phase cable and the second three-phase cable passes between the engine and the electric motor in a rotary axis direction of the electric motor.

10. The vehicle drive unit according to claim 6, wherein at least one of the three-phase cable and the second three-phase cable is arranged on an inner side in the orthogonal direction from a case that houses the electric motor.

11. A vehicle drive unit comprising:
an electric motor having a rotary axis;
a power control unit; and
a cable having a first end portion connected to the power control unit and a second end portion connected to the electric motor;
wherein the cable extends directly from the power control unit in a first direction away from the rotary axis, the cable curving to extend in a second, substantially opposite direction to form a swing absorber between the first end portion and the second end portion.

12. The vehicle drive unit according to claim 11, wherein the cable is a three-phase cable.

13. The vehicle drive unit according to claim 11, wherein the swing absorber is U-shaped.

14. The vehicle drive unit according to claim 11, wherein the first end portion of the cable is connected to the power control unit in a direction substantially orthogonal to the rotary axis, and the second end portion of the cable is connected to the electric motor in a direction substantially parallel to the rotary axis.

15. The vehicle drive unit according to claim 11, wherein the first end portion of the cable and the second end portion of the cable are on opposite sides of the rotary axis in a direction substantially orthogonal to the rotary axis.

16. A vehicle drive unit comprising:
an electric motor;
a power control unit positioned in a vertically overlapping relationship with respect to the electric motor; and
a cable having a first end portion connected to the power control unit and a second end portion connected to the electric motor, the cable extending from the power control unit in a front-back direction of a vehicle and curving to extend in a substantially opposite direction to form a swing absorber between the first end portion and the second end portion.

17. The vehicle drive unit according to claim 16, wherein the electric motor has a rotary axis, and the cable extends in a direction substantially orthogonal to the rotary axis.

18. The vehicle drive unit according to claim 17, wherein the drive unit comprises a first end side located rearward of the rotary axis, and a second end side located forward of the rotary axis, and wherein the cable is connected to the power control unit at the first end side, and the cable is connected to the electric motor at the second end side.

19. The vehicle drive unit according to claim 18, further comprising:
a second electric motor; and
a second cable that connects the power control unit and the second electric motor.

20. The vehicle drive unit according to claim 19 wherein:
a first end portion of the second cable is connected to the second end side of the power control unit;
a second end portion of the second cable is connected to the first end side of the second electric motor; and
a second swing absorber is provided between the first end portion and the second end portion of the second cable.

* * * * *